UNITED STATES PATENT OFFICE.

WALTER WILHELMY, SR., OF PUEBLO, COLORADO.

PROCESS FOR MAKING NON-INTOXICATING BEVERAGES.

1,338,803.        Specification of Letters Patent.     Patented May 4, 1920.

No Drawing.     Application filed May 17, 1919. Serial No. 297,893.

*To all whom it may concern:*

Be it known that I, WALTER WILHELMY, Sr., a citizen of the United States, residing at Pueblo, in the county of Pueblo and State of Colorado, have invented certain new and useful Improvements in Processes for Making Non-Intoxicating Beverages—what are generally known as near beers—of which the following is a specification.

In the manufacture of beverages having an alcoholic content of less than ½ of one per cent. a considerable proportion of malt and cereals is required; also the brewing operation must be carried on for a considerable length of time, at a great expense in fuel and equipment. These beverages generally necessitate the use of special apparatus not included in standard brewing equipment, and, in addition to the space required for such machinery, many days are consumed in the manufacture of the product. These are factors which it has been found difficult, if not impossible, to modify to any great extent.

According to my invention, I accomplish very desirable results in that the manufacture of the product may be carried on with merely the usual equipment of a modern brewery, with a great saving of space as compared with what is generally required for the production of similar beverages, and with about one-third the total time that is required in the making of such beverages. Furthermore, according to my process, I am enabled to get along with from one-fourth to one-fifth of the usual amount of malt and cereals that is required in the production of similar beverages, and at the same time produce a beer having an excellent flavor, and other desirable qualities. All these as well as other objects are in contemplation in connection with my invention, which I will now explain in detail.

A clear understanding may best be had by considering the steps and ingredients necessary to the production of, say, 100 barrels of beer. For this purpose, a mash is prepared from 500 pounds of ground light barley malt mixed with 300 pounds of ground caramel barley malt which is placed in a rice cooker, together with 18 barrels of water at about 77° F., and thoroughly mixed up for about one hour. It will be evident to anyone skilled in the art that this is the temperature of peptonization and not that of saccharification. The liquid is then raised to a boiling temperature as quickly as possible, and there held for approximately five minutes. It is then transferred into a mash tank, settling for one hour or so, following which the wort is drawn off into a brew kettle, containing about 85 barrels of boiling water.

To the product which is held at boiling temperature, about 20 pounds of hops are added, together with enough water to make 110 barrels altogether, as in the subsequent operations about 10% of the volume will be lost. After boiling the wort for about one hour, 30 more pounds of hops are added, and the boiling continued for about 10 minutes longer. The wort is then drained into a hop jack, from whence it is transferred to a cooler where the wort is allowed to cool down to about 68° F. It will now be found that the wort contains about 1½ per cent. extract Balling, instead of 7 to 9% which is the more usual amount.

To each barrel of beer I then add ¼ pound of yeast to induce fermentation which is allowed to continue for about 36 hours. At the end of that time the beer is transferred to a cooler and reduced to 34 or 36.5° F., and allowed to stand in a settling tank for a period of three or four days. To give body to the beer 200 pounds of sugar or 200 pounds of Malto (dextrin) may be added. Thereafter the beverage is filtered and carbonated and made ready for the market.

The steps that I have outlined, as well as the ingredients in the proportions stated, may be varied to some extent, but actual experience has demonstrated that the formula above given will produce the most satisfactory results. A beer so formed will have an alcoholic content of less than ½ of one per cent., possesses excellent keeping qualities, and is entirely palatable to drink at temperatures considerably higher than other near beers with which I am familiar.

I claim:

1. The process of making a non-intoxicating beverage which consists in rapidly raising a mash to the boiling point for a brief period of time, transferring the liquid to a mash tank for settling, drawing off the wort into a kettle containing boiling water, adding hops to the product during boiling at intervals of time about one hour apart, cooling the product, subjecting the product to fermentation, adding a body-giving substance and finally carbonating the beverage.

2. The process of making a thin wort for non-intoxicating beverages, consisting of producing a malt mash, and peptonizing it at a relatively low temperature; raising the mash rapidly to a boiling temperature for a brief period of time to limit saccharification, transferring and settling the wort for a predetermined period, transferring the wort into a container of boiling water, holding the brew at the boiling temperature for a predetermined time and periodically adding hops during this time, fermenting the product at a moderately high fermenting temperature, cooling the product and allowing it to stand at low temperature for a specified time, and adding a body-giving substance.

3. The process of making a non-intoxicating beverage, which consists in adding yeast to a thin wort, containing extract of hops, at a moderately high fermenting temperature; allowing to stand for a predetermined time, reducing to a cooling temperature, and allowing to stand at such temperature for a specified time; adding a body giving substance and finally carbonating the beverage.

4. The process of making a thin wort for non-intoxicating beverages, consisting of producing a mash from ground malt, and peptonizing the same at a low temperature; rapidly raising the mesh to the boiling point to limit saccharification, settling the mesh, drawing off the wort and subjecting it to further boiling, hopping the wort, continuing the boiling and completing fermentation at a moderately high fermenting temperature; storing at a low temperature, and adding a body giving substance.

5. The process of making a thin wort for non-intoxicating beverages, consisting of producing a ground malt mash, and peptonizing the same at a low temperature; rapidly rasing the mash to the boiling point to limit saccharification, settling the mash and subsequently transferring the wort into boiling water at which it is held at boiling temperature, adding hops and water, boiling, adding more hops and continuing the boiling; draining off and cooling the wort when it will be found to contain about $1\frac{1}{2}\%$ Balling; inducing fermentation and completing the same at a moderately high fermenting temperature, storing at a low temperature, and adding a body giving substance.

6. The process of making a non-intoxicating beverage, which consists in mixing a mash from about 500 pounds of ground light malt, about 300 pounds of ground caramel malt and about 18 barrels of water at 77° F.; boiling for a short period, settling and drawing off the wort and mixing the same with about 85 barrels of boiling water, boiling, adding predetermined quantities of hops at intervals during the boiling and also adding sufficient water to make a volume of about 100 barrrels after the completion of the boiling operation, draining and cooling to about 68° F., adding yeast in the proportion of about $\frac{1}{4}$ pound for each barrel of beer, and allowing to ferment for about 36 hours; cooling the brew, and allowing to stand for a specified period; adding a body giving substance and finally carbonating.

WALTER WILHELMY, Sr.

Witness:
OTTO H. JURGENS.